(12) United States Patent
Evertz et al.

(10) Patent No.: US 9,242,327 B2
(45) Date of Patent: Jan. 26, 2016

(54) MACHINE TOOL HAVING WORKPIECE HOPPER

(75) Inventors: Jörg Evertz, Birmensdorf (CH); Holger Von Both, Singen (DE)

(73) Assignee: Ivolclar Vivadent AG, Schaan (LI)

( * ) Notice: Subject to any disclaimer, the term of this patent is extended or adjusted under 35 U.S.C. 154(b) by 778 days.

(21) Appl. No.: 13/144,516

(22) PCT Filed: Jan. 15, 2010

(86) PCT No.: PCT/EP2010/000198
§ 371 (c)(1),
(2), (4) Date: Jul. 14, 2011

(87) PCT Pub. No.: WO2010/081711
PCT Pub. Date: Jul. 22, 2010

(65) Prior Publication Data
US 2011/0280692 A1   Nov. 17, 2011

(30) Foreign Application Priority Data

Jan. 16, 2009  (DE) .......................... 10 2009 005 945
Feb. 24, 2009  (DE) .......................... 10 2009 011 672

(51) Int. Cl.
*B23Q 7/10*   (2006.01)
*B23Q 7/04*   (2006.01)
(Continued)

(52) U.S. Cl.
CPC  *B23Q 7/047* (2013.01); *B23Q 7/10* (2013.01); *B23Q 7/1494* (2013.01); *B23Q 11/0891* (2013.01); *B23Q 7/02* (2013.01); *Y10T 409/30392* (2015.01); *Y10T 409/305432* (2015.01); *Y10T 409/305824* (2015.01)

(58) Field of Classification Search
CPC ........ B23Q 7/02; B23Q 7/10; B23Q 11/0891; B23Q 11/00; B23Q 7/00
USPC ........ 408/69–71, 89; 409/134, 159, 161, 172, 409/173, 197, 198; 29/33 P
See application file for complete search history.

(56) References Cited

U.S. PATENT DOCUMENTS 3,825,245 A * 7/1974 Osburn et al. ................... 269/30
4,480,738 A   11/1984 Mattson
(Continued)

FOREIGN PATENT DOCUMENTS

DE   30 43 361 A1   7/1981
DE   197 53 797 A1   6/1999
(Continued)

*Primary Examiner* — Sunil K Singh
*Assistant Examiner* — Ryan Rufo
(74) *Attorney, Agent, or Firm* — Ann M. Knab; Thad McMurray (57) ABSTRACT

A machining device for material-removing machining of a workpiece includes a stationary frame, a workpiece magazine, a workpiece slide movable relative to the frame and accommodates a workpiece and a housing which encompasses a machining chamber and is located outside the workpiece magazine, wherein the workpiece magazine accommodates a plurality of workpieces, the workpiece magazine moves workpieces to an interchange point, the workpiece slide imparts translational movement to a workpiece along an X axis during workpiece machining and the workpiece slide is movable along the X axis to such an extent that the workpiece located on the workpiece slide is movable to the interchange point disposed outside the machining chamber encompassed by the housing.

16 Claims, 4 Drawing Sheets

(51) Int. Cl.
*B23Q 7/14* (2006.01)
*B23Q 11/08* (2006.01)
*B23Q 7/02* (2006.01)

(56) References Cited

U.S. PATENT DOCUMENTS

| | | | |
|---|---|---|---|
| 4,644,635 A * | 2/1987 | Murai et al. | 483/54 |
| 4,673,076 A * | 6/1987 | Mattson | 198/346.2 |
| 4,747,193 A * | 5/1988 | Hashidate et al. | 29/33 P |
| 4,809,422 A * | 3/1989 | Kitamura | 483/14 |
| 4,985,971 A * | 1/1991 | Kitamura | 29/33 P |
| 5,153,973 A * | 10/1992 | Kitamura | 29/33 P |
| 5,156,254 A * | 10/1992 | Kitamura et al. | 198/346.1 |
| 5,222,285 A * | 6/1993 | Horikawa | 29/33 P |
| 5,439,431 A * | 8/1995 | Hessbruggen et al. | 483/14 |
| 5,669,751 A * | 9/1997 | Hoffman et al. | 414/751.1 |
| 5,781,983 A | 7/1998 | Gruner | |
| 5,933,933 A * | 8/1999 | Fritz et al. | 29/33 P |
| 6,055,892 A * | 5/2000 | Otake | 82/124 |
| 6,082,937 A * | 7/2000 | Ratte | 409/132 |
| 6,679,369 B2 * | 1/2004 | Okuyama | 198/346.1 |
| 7,213,316 B2 * | 5/2007 | Kato | 29/33 P |
| 2001/0047701 A1 * | 12/2001 | Nakai et al. | 82/117 |
| 2003/0177623 A1 * | 9/2003 | Geissler et al. | 29/27 C |
| 2005/0022350 A1 * | 2/2005 | Tokuma et al. | 29/27 C |
| 2006/0270540 A1 | 11/2006 | Takayama et al. | |
| 2007/0022591 A1 * | 2/2007 | Bernhard et al. | 29/33 P |
| 2009/0110505 A1 | 4/2009 | Jung | |

FOREIGN PATENT DOCUMENTS

| | | | |
|---|---|---|---|
| DE | 209 23 033 | 3/2000 | |
| DE | 299 23 033 U1 | 3/2000 | |
| DE | 198 53 945 A1 | 6/2000 | |
| DE | 10 2006 024 407 A1 | 12/2006 | |
| DE | 20 2007 014 117 U1 | 12/2007 | |
| EP | 0673711 A1 * | 3/1999 | B23Q 7/02 |
| EP | 186372 A1 * | 3/2002 | B23Q 11/00 |
| GB | 2301338 A1 * | 12/1996 | B23Q 7/04 |
| JP | 2001-121301 A * | 5/2001 | B23Q 11/08 |

* cited by examiner

MACHINE TOOL HAVING WORKPIECE HOPPER

RELATED APPLICATIONS

This is a §371 of International Application No. PCT/EP2010/000198, with an international filing date of Jan. 15, 2010 (WO 2010/081711 A1, published Jul. 22, 2010), which is based on German Patent Application Nos. 10 2009 005 945.8, filed Jan. 16, 2009, and 10 2009 011 672.9, filed Feb. 24, 2009, the subject matter of which is incorporated by reference.

TECHNICAL FIELD

This disclosure relates to a machining device for machining a workpiece, more particularly for machining a workpiece or a blank for the fabrication of a dental prosthetic item or a dentition model.

BACKGROUND

A generic machining device comprises a stationary frame, a workpiece magazine, and a workpiece slide capable of being moved relatively to the frame and adapted to accommodate one workpiece. The workpiece magazine is configured to accommodate a number of workpieces that can be moved by the workpiece magazine to an interchange point. Furthermore, the workpiece slide is configured to carry out a translational movement of the workpiece along an X axis when the workpiece is being machined, for example, in a milling, drilling, and/or grinding operation.

Generic machining devices are known. In such generic machining devices, the workpiece magazine serves to accommodate a plurality of workpieces so that the workpiece can be interchanged automatically without manual intervention when one workpiece has been machined to completion and a new workpiece is to be mounted on the workpiece slide for machining purposes. The known machining devices usually comprise a separate manipulating mechanism that serves to transfer a workpiece from the workpiece magazine to the machining position. For this purpose, the manipulating equipment picks up a workpiece located at the interchange point of the workpiece magazine and keeps it in the machining position for subsequent machining Pallet systems are also known in which pallets, together with workpieces clamped thereon, are moved automatically to a machining position, in which machining then takes place while the pallet remains stationary.

The disadvantage of that known design is that the manipulating equipment requires additional space and involves additional costs. Particularly in the case of machining devices configured to produce dental prosthetic items from blanks, the additional space required by the manipulating equipment is a drawback since these devices are intended to have a space-saving design to allow them to be set up in a dental laboratory or a dentist's premises.

It could therefore be helpful to improve a generic machining device, especially to the effect that workpieces can be transferred from the workpiece magazine to the machining position on the workpiece slide without incurring the drawbacks of the prior art.

SUMMARY

We provide a machining device for material-removing machining of a workpiece including a stationary frame, a workpiece magazine, a workpiece slide movable relative to the frame and accommodates a workpiece, and a housing which encompasses a machining chamber and is located outside the workpiece magazine, wherein the workpiece magazine accommodates a plurality of workpieces, the workpiece magazine moves workpieces to an interchange point, the workpiece slide imparts translational movement to a workpiece along an X axis during workpiece machining, and the workpiece slide is movable along the X axis to such an extent that the workpiece located on the workpiece slide is movable to said interchange point disposed outside the machining chamber encompassed by the housing. The X axis is defined as an imaginary straight line extending between the workpiece maching chamber and the interchange point.

Our machining device includes a workpiece slide that can be moved along the X axis to such an extent that the workpiece mounted on the workpiece slide can move to the interchange point.

Separate manipulating equipment for manipulating the workpieces is thus completely unnecessary. Instead, the capability of the workpiece slide to move along the X axis for machining purposes is implemented for the purpose of moving the workpiece to the interchange point. For this purpose, the interchange point is arranged to be in alignment with the path of movement of the workpiece along the X axis. Preferably, the capability of the workpiece to move along the X axis provides the only way of displacing the workpiece relatively to the tool along the X axis.

With regard to the workpiece magazine, the aforementioned interchange point can be reached by the workpiece to be mounted on the workpiece slide without previously effecting removal of this workpiece from the other workpieces. Preferably, the workpieces are capable of being moved automatically along a common path of movement, the interchange point being located in this path of movement. Collective movement of all of the workpieces accommodated in the workpiece magazine thus makes it possible to move the workpiece intended for the machining operation to the interchange point. When this workpiece has reached the interchange point, the drive for the workpiece magazine is stopped so that the workpiece in question ceases to move at the interchange point. It can be picked up directly by the workpiece slide in that the workpiece slide is moved beyond the boundary of the machining chamber in which the workpiece slide is moved for the purpose of machining the workpiece. The workpiece slide is moved out to such an extent as to make it possible to couple the workpiece to the workpiece slide. Once the workpiece slide has been coupled to the workpiece, the workpiece is moved away from the interchange point by the workpiece slide into the machining chamber.

Preferably, a coupling mechanism is provided on the workpiece slide, which coupling mechanism can be activated by a control unit pertaining to the machining device and by which a workpiece located in a coupling position can be securely connected to the workpiece slide.

In the case of an interchange of a previously machined workpiece with a workpiece yet to be machined, the previously machined workpiece is first inserted by the machining device into a slot of the workpiece magazine at the interchange point. If this workpiece had previously been securely connected to the workpiece slide by the aforementioned coupling mechanism, the previously machined workpiece is decoupled from the workpiece slide at the interchange point. Then a new workpiece is moved to this interchange point by the drive for the workpiece magazine, which workpiece is then picked up by the workpiece slide or coupled by the coupling mechanism to the workpiece slide.

Preferably, the workpieces are each fastened to a workpiece holder, the workpiece magazine and the workpiece slide being configured to manipulate these workpiece holders. Thus, in such an example, it is not merely the workpieces or blanks that are transferred from the workpiece magazine to the workpiece slide, but instead this action is carried out by the workpieces or blanks together with a workpiece holder firmly attached thereto. This facilitates manipulation since coupling means for coupling the workpiece holder to the workpiece magazine and/or the workpiece slide can be readily provided on the workpiece holder. More particularly, separate coupling means can be provided on the workpiece holder for coupling the workpiece holder to the workpiece slide, on the one hand, and for guiding the workpiece holder by means of the workpiece magazine, on the other.

It is particularly advantageous when the workpiece magazine is in the form of a separate detachable and removable unit. This results in a modular design of the machining device, by which operation of the device is occasionally possible without the need for a workpiece magazine. In one example of the machining device not including the attachable workpiece magazine, the interchange point is preferably accessible from outside to manually change the workpieces. It is then possible to implement the same motion sequence as is carried out by the workpiece slide when a workpiece magazine is present, and the workpiece to be coupled to the workpiece slide is manually placed by an operator at the interchange point for the purpose of coupling the workpiece to the workpiece slide, instead of the workpieces being moved automatically by the workpiece magazine.

In this context, it is particularly advantageous when the machining device comprises a housing that encompasses a machining chamber, while the workpiece magazine is provided outside this housing. In such an example of the machining device, the interchange point is also provided outside the housing. Therefore, in both cases, in which the workpiece magazine is either present or not present, the interchange of workpieces takes place outside the machining chamber. Thus, when the workpiece is changed manually, it is unnecessary to open the machining chamber in its entirety. Instead, it is sufficient to move the workpiece slide along the X axis to a point that is at least partly outside the machining chamber and thus outside the housing, so that a workpiece to be subsequently machined can be coupled to the workpiece slide when outside the housing.

The workpiece magazine is configured to move the workpieces along a path of movement. This path of movement can be one that is not closed so that the workpieces in the workpiece magazine can be moved between two end positions. However, an example of the workpiece magazine comprising a closed path of movement is preferred in which each of the workpieces in the workpiece magazine can be moved from two alternative directions to the interchange point. In the case of such a closed path of movement, that is, complete rotational capability of the workpieces, the average distance to be covered by the workpieces mounted in the workpiece magazine is shorter.

In the simplest case, the path of movement is linear, as provided, for example, by a workpiece magazine that can move the workpieces in the vertical direction. However, it is preferred that the path of movement be not linear but instead in the form of a circle or an arc of a circle, for example, since this shape makes it possible to provide a comparatively large number of workpieces in a comparatively small space. The direction of movement of the workpieces mounted in the workpiece magazine, particularly in the region of the interchange point, is preferably oriented to extend orthogonally to the X axis.

In our machining device of the invention, the workpiece magazine can be of a very simple design. In the simplest case, it is merely configured to automatically and collectively handle all workpieces present therein. Thus, the workpiece magazine need not have any motors or actuators that make it possible for every single workpiece to be manipulated individually. Instead, only one common drive unit is provided, by which all workpieces present in the workpiece magazine can be moved collectively. Thus, for example, this drive unit can be provided for effecting rotational movement of a rotor comprising a number of workpiece slots provided at its periphery.

Preferably, the workpieces are secured, along at least part of the path of movement, from removal thereof from the workpiece magazine and can only be removed from, or inserted into, special sections thereof. Preferably, such a section is also provided at the interchange point so that a workpiece located at the interchange point can be removed from the workpiece magazine transversely relatively to the path of movement, more particularly along the X axis, without requiring the workpiece to be decoupled beforehand from the workpiece magazine by a motor.

Preferably, the machining device comprises a control unit configured such that it controls the movement of the workpiece slide both for the purpose of moving the workpiece relatively to the tool during the machining operation and for the purpose of carrying out workpiece interchange. Thus, this control unit is adapted activate the workpiece slide in the sense of the double function just described.

BRIEF DESCRIPTION OF THE DRAWINGS

Additional aspects and advantages are revealed in the appended claims and in the following description of a preferred example, which is explained below with reference to the figures, in which:

DETAILED DESCRIPTION

Figure 1:
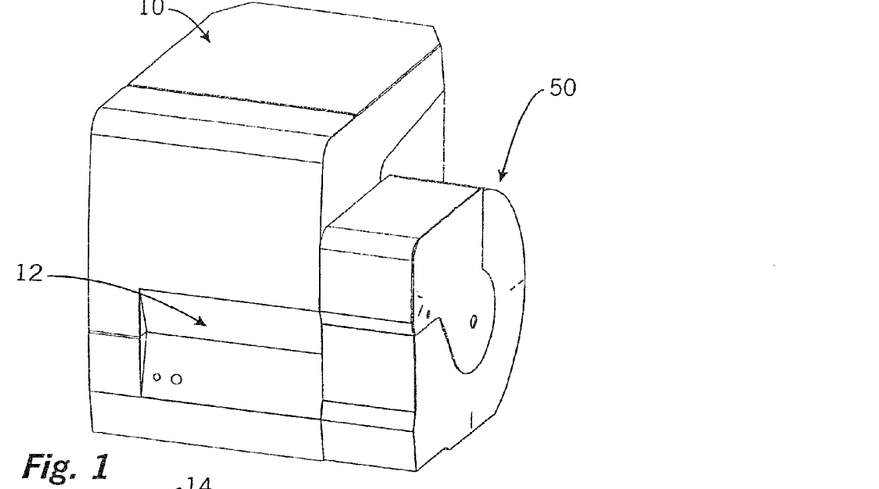
FIG. 1 shows a machining device including a workpiece magazine.

FIG. 1 shows our machining device. The machining device comprises a main unit 10, in which there is provided a machining chamber 12 visible through a pane in the closed state of the machining device shown in that figure. On the main unit 10 there is provided a workpiece magazine unit 50 that is detachably coupled to the main unit 10.

Figure 2:
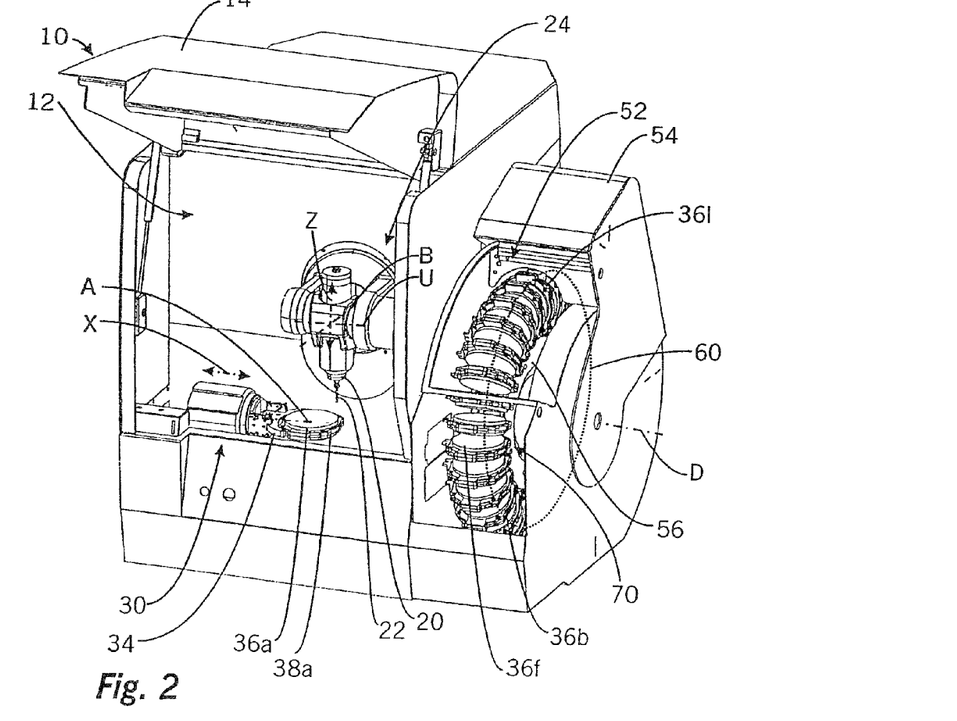
FIG. 2 shows an open state of the machining device shown in FIG. 1.

FIG. 2 shows an open state of the machining device shown in FIG. 1. Both an access cover 14 for the main unit 10 and an access cover 54 for the workpiece magazine unit 50 are open in this state so that the machining chamber 12 and the workpiece magazine chamber 52 are freely accessible.

A spindle 20 with a tool 22 inserted therein is provided in the machining chamber 12. This spindle 20 can be moved translationally along a Z axis and is pivoted about two axes U and B, which extend orthogonally to each other, by a moving unit 24 not described in detail.

In the machining chamber 12 there is also disposed a workpiece slide 30 that can be moved translationally along an X axis. For this purpose, guide rails are provided on the rear wall of the machining chamber, which guide rails are not visible in the view shown in FIG. 2. A clamping device 34, which can pivot about an A axis and to which a workpiece 36a can be coupled by a workpiece holder 38a firmly attached to the workpiece, is provided on the workpiece slide 30. The position of the workpiece 36a relative to the tool 22 during a machining operation, not described in detail, is controlled by way of the capability of the workpiece slide 30 to move along the X axis to make it possible to carry out three-dimensional machining of the workpiece 36a by the tool 22.

A plurality of workpieces 36b to 36z is disposed in the open workpiece magazine chamber 52. These workpieces 36b to 36z are mounted on a transporting wheel 56 that is mounted for rotation about an axis of rotation D by an electric motor. All the workpieces 36b to 36z mounted on this transporting wheel 56 can be moved by the same collectively along a path of movement 60. This path of movement 60 is circular in accordance with the shape of the transporting wheel 56. The workpieces are moved along this path of movement 60 in a plane, the normal vector of which is parallel to the X axis.

The path of movement 60, along which the workpieces 36b to 36z can be moved by the transporting wheel 56, is disposed in such a way relative to the workpiece slide 30 and to its capability to move along the X axis that a interchange point 70 is provided on the path of movement 60, which interchange point 70 aligns with the direction of movement of the slide 30 along the X axis, so that the slide 30 can, together with the clamping device 34, be moved to the interchange point. In the state shown in FIG. 2, the workpiece 36f is at said interchange point 70.

The interchange point 70, which can be reached, on the one hand, by the workpieces attached to the transporting wheel 56 in the workpiece magazine 50 and, on the other hand, by the clamping device 34 or the workpiece 36a coupled to the clamping device 34 by virtue of the movement of the slide 30, allows workpieces 36a to 36z to be interchanged between the workpiece slide 30 and the transporting wheel 56 in the workpiece magazine 50 without any need for additional manipulating equipment for the purpose of moving the workpiece from the transporting wheel 56 to the slide 30 or from the slide 30 to the transporting wheel 56. Instead, a new workpiece 36f can be coupled to the workpiece slide 30 in that this workpiece 36f to be coupled is first moved to the interchange point 70 by the transporting wheel 56. Then, the workpiece slide 30 travels to the right, with reference to FIGS. 1 and 2, until the clamping device 34 on the workpiece slide 30 bears against the workpiece 36f to be machined or against its workpiece holder 38f. In this state, the workpiece holder 38f is coupled to the clamping device 34 by a control unit pertaining to the machining device. On completion of this coupling operation, the workpiece slide 30, together with the workpiece 36f now attached thereto, is moved to the left so that the workpiece 36f enters the machining chamber 12. Subsequently, machining of the workpiece 36f can begin at this stage, for which purpose the capability of the workpiece slide 30 to move is implemented during the machining operation to move the workpiece 36f relatively to the tool 22 along the X axis. Therefore, it is not necessary for, say, the tool 22 to be additionally capable of being moved along the X axis.

The coupling device for coupling a workpiece or the workpiece holder to the clamping device 34 and the method of attaching the workpieces disposed in the workpiece magazine to the transporting wheel 56 will now be explained with reference to FIGS. 3 and 4.

In the machining chamber 12 there is also disposed a workpiece slide 30 that can be moved translationally along an X axis. For this purpose, guide rails are provided on the rear wall of the machining chamber, which guide rails are not visible in the view shown in FIG. 2. A clamping device 34, which can pivot about an A axis, which is an imaginary line that is parallel to the X axis, and to which a workpiece 36a can be coupled by a workpiece holder 38a firmly attached to the workpiece, is provided on the workpiece slide 30. The position of the workpiece 36a relative to the tool 22 during a machining operation, not described in detail, is controlled by way of the capability of the workpiece slide 30 to move along the X axis to make it possible to carry out three-dimensional machining of the workpiece 36a by the tool 22.

In addition to the first plug-in element 39a, the workpiece holder 38a comprises a second plug-in element 39b, the significance of which will be explained in connection with FIG. 4.

Figures 3, 4:
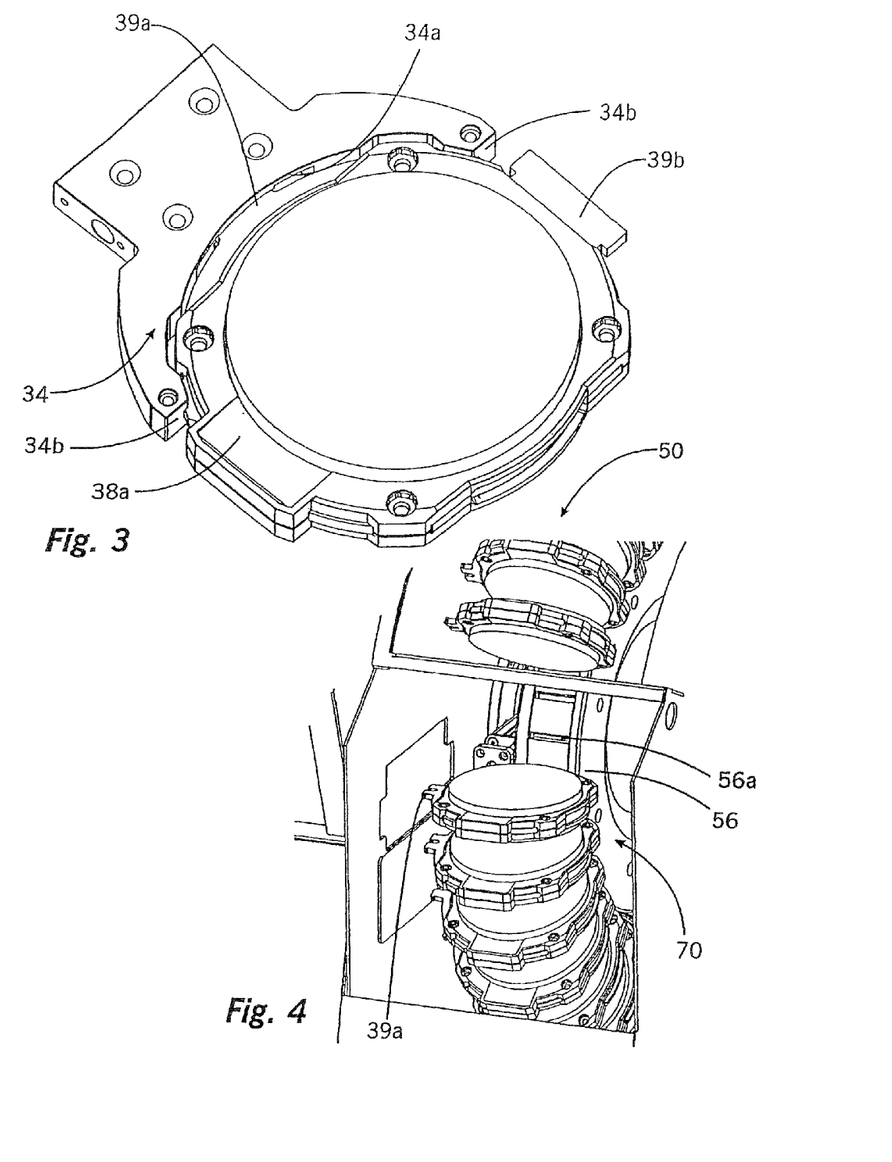
FIG. 3 shows a coupling mechanism provided on a workpiece slide of the machining device shown in FIGS. 1 and 2.
FIG. 4 shows means for securing the workpieces in the workpiece magazine.

FIG. 4 shows the interchange point 70 of the workpiece changer 50 on an enlarged scale. It can be seen that the transporting wheel 56 comprises slot-shaped recesses 56a provided at the periphery of the transporting wheel for each workpiece holder. The second plug-in elements 39b of the workpiece holders shown in FIG. 3 can be inserted into these recesses 56a. Thus, the workpiece holders will be held firmly in these recesses 56a without any need for any additional securing means to stay immovable in relation to the transporting wheel when trans-ported by the transporting wheel 56 during rotation of the same. In a manner not shown in detail, the recesses 56a are provided on both sides with grooves that are oriented toward each other and that positively cooperate with the second plug-in elements 39b of the workpiece holders.

When inserting a workpiece holder into the transporting wheel, the clamping device 34 is moved together with the workpiece holder far enough to enable the second plug-in element 39b pertaining to the workpiece holder 38a to slide into the recess 56a, where the second plug-in element is coupled positively with the transporting wheel 56, as mentioned above, by engagement of the second plug-in elements in the aforementioned grooves. The securing elements of the clamping device 34 that previously established the positive lock between the first plug-in elements 39a and the clamping device 34 then disengage. By reason of the previously established positive lock between the second plug-in element 39b and the transporting wheel 56, the subsequent return movement of the clamping device 34 to the left results in the workpiece holder 38a of interest being detached from the clamping device 34 and remaining on the transporting wheel 56.

When a new workpiece is to be coupled to the clamping device, the vacant clamping device 34 approaches the respective workpiece holder held on the transporting wheel 56 such that the first plug-in element 39a enters the recess 34a. When this has taken place, the securing elements engage the workpiece holder, and the clamping device is moved, together with the workpiece holder coupled thereto, back into the machining chamber. The workpiece holder is released from the transporting wheel, with which it is no longer positively connected at this stage.

FIGS. 5a to 5f show various stages of the workpiece interchange operation.

Figure 5A:
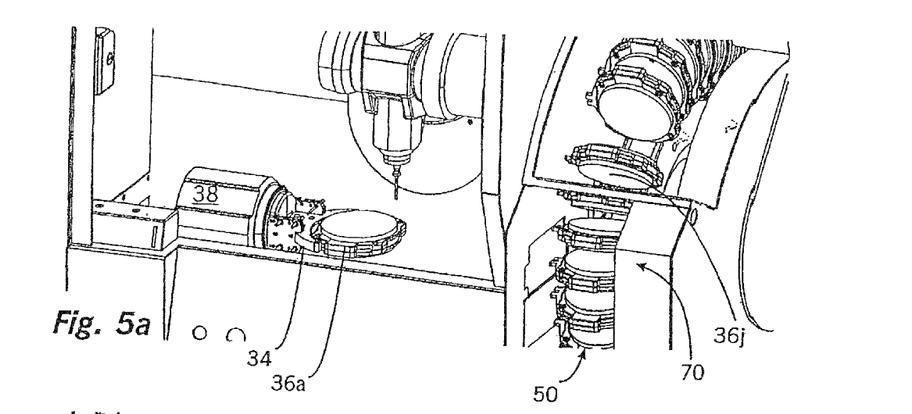
FIGS. 5a to 5f show various stages of a workpiece interchanging operation.

FIG. 5a shows, on an enlarged scale, a state of the machining device that corresponds to the state shown in FIG. 2. In this state, there is already a workpiece 36*a* coupled to the clamping device 34 on the workpiece slide 30, which workpiece 36*a* is to be inserted into the workpiece magazine, after which another workpiece 36*j* is to be removed from the workpiece changer 50 for machining purposes.

Figure 5B:
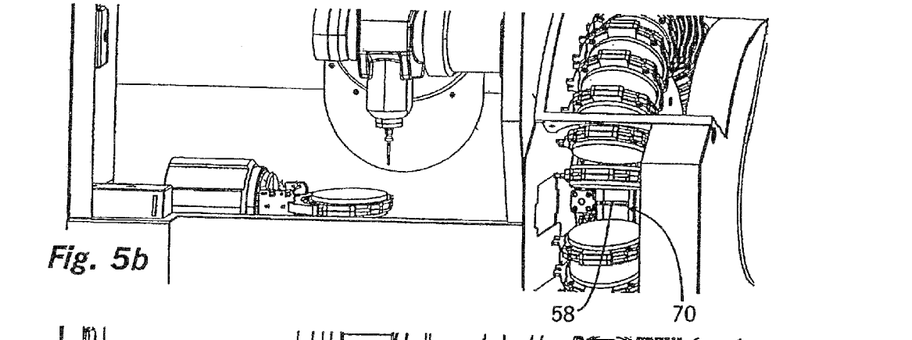
Figure 5C:
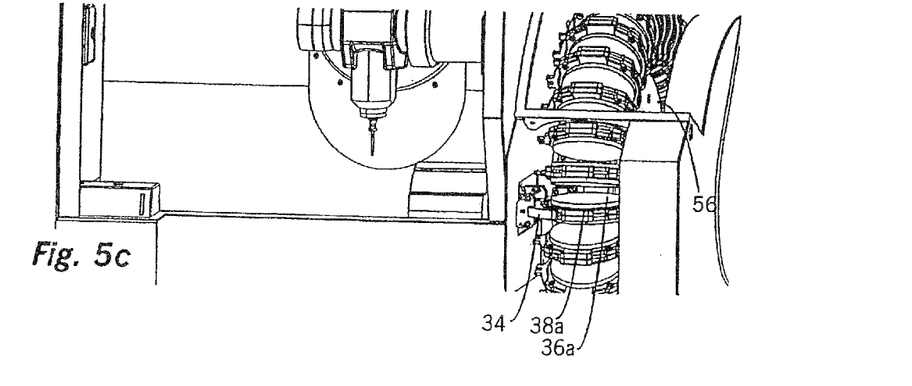

For this purpose, the transporting wheel 56 pertaining to the workpiece changer 50 is first activated. Thus, all workpieces present in the workpiece changer are rotated about the axis of rotation D until a vacant slot 58 has reached the interchange point 70. This state is shown in FIG. 5*b*.

At this stage, the slide 30 is moved to the right, together with the workpiece 36*a* coupled to the clamping device 34. In this way the workpiece holder 38*a* on the workpiece 36*a* engages the transporting wheel 56. Once this state, shown in FIG. 5*c*, has been achieved, the workpiece holder 38*a* is decoupled from the clamping device 34 by the control unit pertaining to the machining device.

Figure 5D:
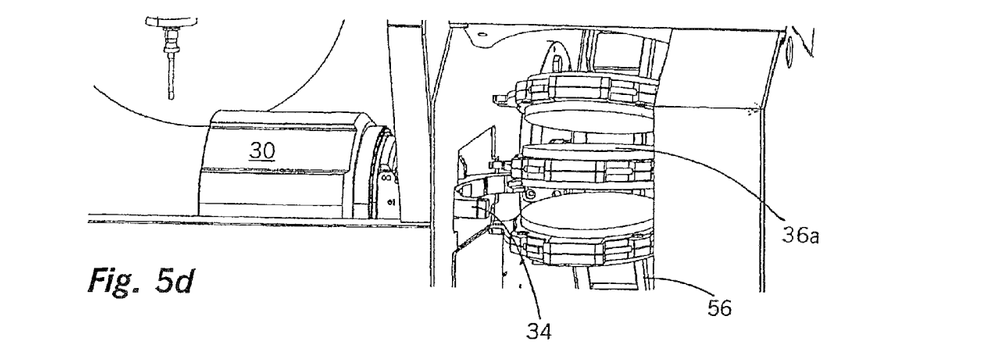
Figure 5E:
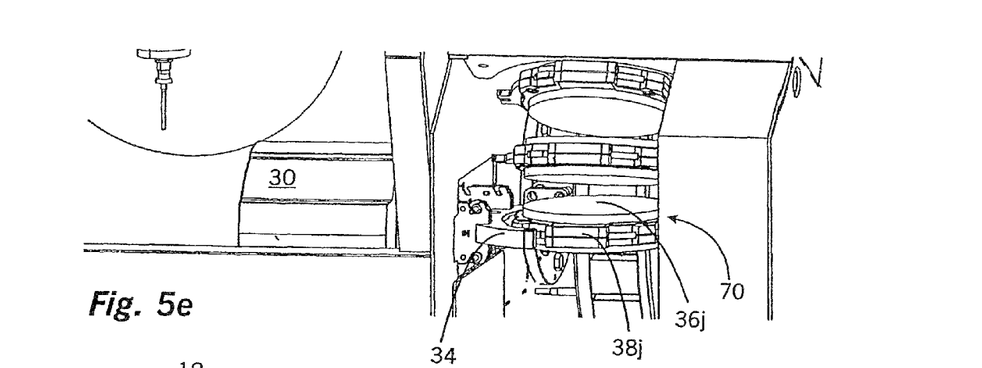

After the slide 30 has moved slightly to the left to become detached from the workpiece holder 38*a*, the transporting wheel 56 is moved on by the electric motor pertaining to the workpiece changer. The workpiece 36*a*, now decoupled from the clamping device 34, is moved by the transporting wheel away from the clamping device 34. This state is shown in FIG. 5*d*.

The movement of the transporting wheel 56 is continued until the workpiece 36*j* is situated at the interchange point 70. Once this state, shown in FIG. 5*e*, has been achieved, the slide 30 is again moved slightly to the right so that the clamping device 34 engages the first plug-in element 39*a* of the workpiece holder 38*j*. The clamping device 34 is then activated by the control unit pertaining to the machining device such that the clamping device couples the workpiece 36*j*, together with the workpiece holder 38*j* situated at the interchange point 70, to the workpiece slide 30 by means of the securing elements.

Figure 5F:
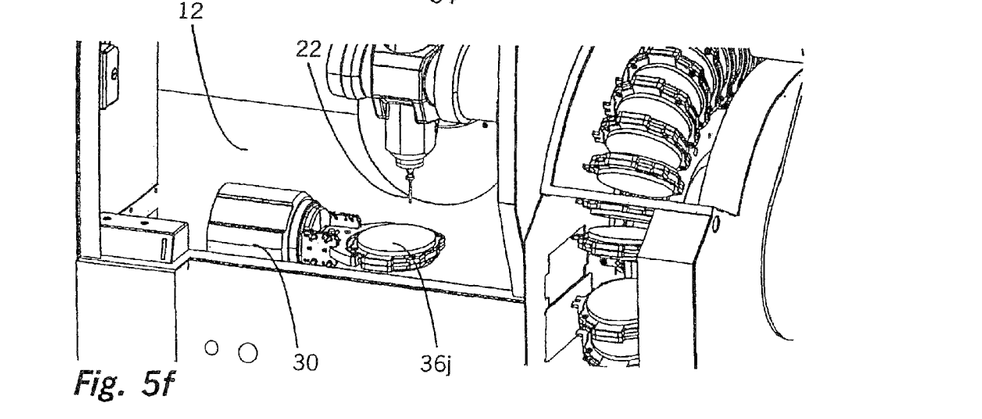

The workpiece slide is then moved back into the machining chamber 12 together with the workpiece 36*j* coupled to the clamping device 34. Machining of the workpiece 36*j* can then begin, for which purpose the capability of the slide 30 to move, as utilized previously for changing the workpiece, is now implemented to achieve three-dimensional mobility of the workpiece 36*j* in relation to the tool 22.

The invention claimed is:

1. A machining device for material-removing machining of a workpiece comprising:
    a stationary frame;
    a workpiece magazine having an access cover for enclosing the workpiece magazine;
    a workpiece slide movable relative to said frame and accommodates a workpiece; and
    a housing which encompasses a machining chamber and is located outside the workpiece magazine,
    wherein
    said workpiece magazine accommodates a plurality of workpieces;
    said workpiece magazine moves workpieces to an interchange point;
    said workpiece slide imparts translational movement to a workpiece along an X axis during workpiece machining, wherein the X axis is an imaginary straight line extending between the workpiece machining chamber and the interchange point;
    said workpiece slide is movable along said X axis to such an extent that said workpiece located on said workpiece slide is movable to said interchange point disposed outside said machining chamber encompassed by said housing; and
    said workpiece slide comprises a clamping device that can pivot about an A axis, wherein the A axis is an imaginary line that is parallel to the X axis.

2. The machining device as defined in claim 1, wherein said workpieces are each held in a workpiece holder, and wherein said workpieces are moved collectively in said workpiece magazine by a transporting wheel to the interchange point.

3. The machining device as defined in claim 1, wherein said workpiece magazine is a separate releasable and removable unit.

4. The machining device as defined in claim 1, wherein said workpiece magazine performs automated continuously circulating motion of all workpieces present therein collectively along a closed path.

5. The machining device as defined in claim 1, wherein said machining device comprises a controlling device that controls movement of the workpiece slide both for moving said workpiece relative to a tool during machining and to effect said workpiece interchange.

6. The machining device as defined in claim 2, wherein said workpiece magazine is a separate releasable and removable unit.

7. The machining device as defined in claim 2, wherein said workpiece magazine performs automated continuously circulating motion of all workpieces present therein collectively along a closed path.

8. The machining device as defined in claim 3, wherein said workpiece magazine performs automated continuously circulating motion of all workpieces present therein collectively along a closed path.

9. The machining device as defined in claim 2, wherein said machining device comprises a controlling device that controls movement of the workpiece slide both for moving said workpiece relative to a tool during machining and to effect said workpiece interchange.

10. The machining device as defined in claim 3, wherein said machining device comprises a controlling device that controls movement of the workpiece slide both for moving said workpiece relative to a tool during machining and to effect said workpiece interchange.

11. The machining device as defined in claim 4, wherein said machining device comprises a controlling device that controls movement of the workpiece slide both for moving said workpiece relative to a tool during machining and to effect said workpiece interchange.

12. A machining device for material-removing machining of a workpiece comprising:
    a stationary frame;
    a workpiece magazine having an access cover for enclosing the workpiece magazine;
    a workpiece slide movable relative to said frame and accommodates a workpiece;
    a housing which encompasses a machining chamber and is located outside the workpiece magazine, and
    a coupling mechanism for coupling a workpiece to the workpiece magazine and to the workpiece slide,
    wherein
    said workpiece magazine accommodates a plurality of workpieces;
    said workpiece magazine moves workpieces to an interchange point;
    said workpiece slide imparts translational movement to a workpiece along an X axis during workpiece machining, wherein the X axis is an imaginary straight line extending between the workpiece machining chamber and the interchange point;

said workpiece slide is movable along said X axis to such an extent that said workpiece located on said workpiece slide is movable to said interchange point disposed outside said machining chamber encompassed by said housing; and said workpiece slide comprises a clamping device that can pivot about an A axis, wherein the A axis is an imaginary line that is parallel to the X axis.

13. The machining device as defined in claim 12, wherein said workpieces are each held in a workpiece holder and wherein said coupling mechanism comprises at least one plug-in element disposed on the workpiece holder.

14. The machining device as defined in claim 13, wherein the coupling mechanism couples the workpiece to the clamping device of the workpiece slide.

15. The machining device as defined in claim 14, wherein the clamping device comprises a recess for receiving at least one plug-in element.

16. The machining device as defined in claim 15, wherein the workpiece magazine comprises a transporting wheel having recesses for receiving plug-in elements.

\* \* \* \* \*

UNITED STATES PATENT AND TRADEMARK OFFICE
CERTIFICATE OF CORRECTION

PATENT NO.        : 9,242,327 B2
APPLICATION NO.   : 13/144516
DATED             : January 26, 2016
INVENTOR(S)       : Jörg Evertz and Holger Von Both It is certified that error appears in the above-identified patent and that said Letters Patent is hereby corrected as shown below:

Title page, item (73), the Assignee should read:

--Ivoclar Vivadent AG,
  Schaan (LI)--

Signed and Sealed this
Seventeenth Day of May, 2016

Michelle K. Lee
*Director of the United States Patent and Trademark Office*